March 3, 1942. A. BERNHARD ET AL 2,275,344
MEASURING INSTRUMENT, PARTICULARLY AN EXPOSURE METER
Filed April 29, 1940
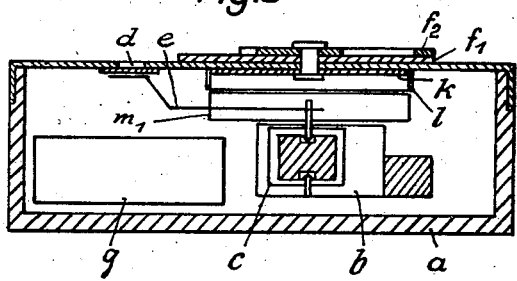
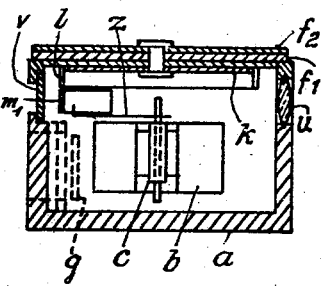
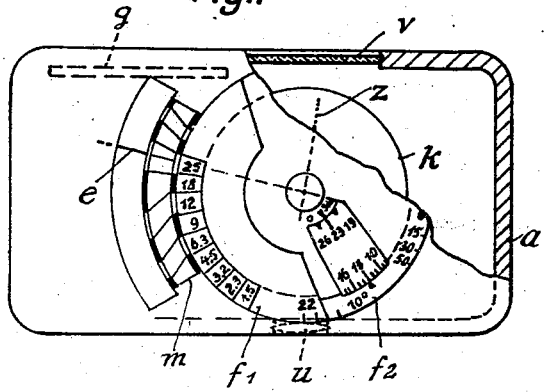
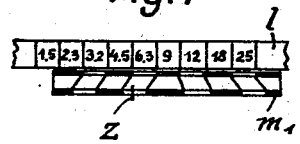
Inventors
A. BERNHARD
G. BEYRICH
H. HABERMANN
By Kimmel & Crowell, attorneys Patented Mar. 3, 1942

2,275,344

UNITED STATES PATENT OFFICE 2,275,344

MEASURING INSTRUMENT, PARTICULARLY AN EXPOSURE METER

Albrecht Bernhard, Guido Beyrich, and Hans Habermann, Nuremberg, Germany, assignors to Metrawatt Aktiengesellschaft, Fabrik Elektrischer Messgeraete, Nuremberg, Germany, a company of Germany Application April 29, 1940, Serial No. 332,358
In Germany October 8, 1938

2 Claims. (Cl. 88—23)

Our invention relates to a measuring instrument, particularly an exposure meter, which is fitted with two reading-off devices one of which is visible from above and the other one from the side with the instrument held at eye level and directed towards the given subject.

One of the known exposure meters, mounted on a camera, can be read from above and also from the side, provided the camera is equipped with a special optical means for that purpose. This known type of exposure meter lacks, moreover, one of the known reckoning or converting means comprising two discs supporting the exposure and diaphragm scales and adjustable relative to one another according to the speed of the negative. Even if the known exposure meter were provided with such means, it would be impossible, however, to employ both scales thereof, one of which is positioned outside the casing, for setting and reading the reckoning device.

According to the invention, this is made possible by the provision of a light, handy instrument requiring little space and capable of being used also independently of a camera, in which a separate pointer of the measuring mechanism is supplied for the transparent reading scale visible from above and the one visible from the side, the scales being arranged inside the casing and illuminated by transmitted light. In further accordance with the invention the two pointers are displaced approximately 90° relative to one another, and each pointer moves in front of a fixed double scale comprising in known manner a non-uniformly divided scale and a uniformly divided scale connected therewith. Opposite the uniformly divided scale a revolving scale corresponding to a determining factor, as the diaphragm, is disposed which for reading from above is arranged on a disc and for reading from the side on a cylinder rigidly connected therewith, the disc, or a member connected therewith and adjustable as to speed, and the casing being fitted with a scale representing the other factor or with a fixed mark cooperating therewith.

One form of the invention is illustrated by way of example in the accompanying drawing, in which Figure 1 is a plan of an exposure meter, partly broken up, according to the invention;

Fig. 2, an axial longitudinal section thereof;

Fig. 3, an axial cross section thereof; and

Fig. 4, a detail view of the reading scales disposed inside.

In a casing $a$ of the exposure meter a moving coil measuring device having a magnet $b$, a moving coil $c$ and a pointer $e$ moving behind a window $d$ is arranged. On the top of the casing $a$, near the window $d$, a reading scale $m$ comprising the non-uniformly divided scale of the moving coil device, a uniformly divided scale and reference lines connecting these scales is provided. The top is further equipped with two adjusting discs $f'$, $f^2$ capable of interlocking and of joint rotation when in that condition. The lower disc $f'$ supports the scale of diaphragm values and of the speeds of the negative, and the upper one $f^2$ carries the exposure scale, both discs being so adjusted relative to one another that a mark of the disc $f^2$ indicates the speed value of the negative material used. Scales of this type are known of course. In the rear of a light admitting aperture a photoelectric cell $g$ connected with the moving coil device is disposed.

The disc $f'$ is rigidly connected with a further disc $k$ rotatable in the casing $a$. The disc $k$ has a cylindrical scale $l$ which moves over a fixed cylindrical scale section $m_1$. Both scales $l$, $m_1$ are made of translucent material and are illuminated through a window $v$ in the wall of the casing, so that they can be read through an observation hole $u$ provided in the opposite wall and fitted with a lens if necessary. The upwardly bent end of the pointer $z$ is visible also, which moves over the non-uniformly divided scale $m_1$ according to the movement of the measuring instrument.

The scale $l$ corresponds to the diaphragm scale of the disc $f'$ and the scale $m_1$ to the reading scale $m$. When the instrument is held at eye level, it is possible to observe with one eye through the opening $u$ the pointer $z$ and the scales $m_1$ and $l$, the light admitting orifice being pointed towards the subject.

Then the discs $f'$, $f^2$ are jointly rotated until the value of the diaphragm used and indicated on the scale $l$ is opposite the field of the scale $m_1$ determined by the deflection of the pointer. The instrument is finally lowered to facilitate reading of the desired exposure on the disc $f^2$ with the aid of the fixed mark.

What is claimed is:

1. An exposure meter comprising a casing including upper, front and side walls, a photo-electric element and a direct current measuring instrument arranged within said casing, a pair of pointers operated by said measuring instrument, a fixed scale on said upper wall, a window in said upper wall adjacent said fixed scale for viewing one of said pointers, said rear wall having an aperture for viewing the other of said pointers, a transparent fixed scale arranged inside the casing adjacent to the said latter pointer, a window provided in the front wall for transmitting light to the transparent scale, each scale comprising a non-uniformly divided graduation and a uniformly divided graduation connected with said first graduation by guide lines, a disc pivotally arranged on said upper wall, a scale on said disc cooperating with said uniform graduation corresponding to a determining factor, a transparent scale of cylindrical form arranged inside the casing adjacent to said transparent fixed scale, and said disc being rigidly connected to said second mentioned transparent scale.

2. The invention as set forth in claim 1 having combined thereto a second disc adjustably connected to said first disc and carrying the scale of a further factor adapted for cooperation with a fixed mark provided on the casing.

ALBRECHT BERNHARD.
GUIDO BEYRICH.
HANS HABERMANN.